UNITED STATES PATENT OFFICE 2,224,720

METHOD OF MAKING A CHEESE-LIKE PRODUCT

Theron H. Butterworth, Syracuse, N. Y., and William A. Sommer, Fond du Lac, Wis., assignors to The Borden Company, New York, N. Y., a corporation of New Jersey No Drawing. Application March 28, 1936, Serial No. 71,444

10 Claims. (Cl. 99—116)

This invention relates to the preparation of food products and more particularly to the preparation of cheese-like spreads and a base material for such spreads.

In the making of cream cheese spreads in the customary fashion it is generally considered desirable to produce a product which is homogeneous and pasty in character, and which can be readily manipulated and served in different forms. The usual practice followed in making such food products involves the use of whole milk which has been enriched with cream to a butter fat content of around 12%. This light cream is then pasteurized, homogenized and set with rennet and lactic-acid-producing bacteria as a "starter." This material is allowed to ripen for from 10–16 hours, after which the curd is broken up, washed and placed in muslin bags for draining. Preliminary drainage usually takes 7–8 hours, after which the bags are packed in ice and further drained for from 3–5 hours. Ordinarily however, the curd is simply left in the ice overnight. The curd is now ready to be taken out of the bags and mixed with salt, coloring, flavoring and condiments. A viscolizer is frequently employed to smooth out the mixture and the temperature during this treatment may be about 145° F.

It is an object of this invention to produce satisfactory curds, properly mixed with other materials, such as salt and sugar, in a very short time and without the necessity of bacterial acid formation.

A further object of the invention is to produce a base material which is relatively free from bacteria, yeast or mold and which is more perfectly pasteurized than spreads produced by the usual method, without being grainy in texture.

Another object of this invention is to produce cream cheese-like spreads and bases therefor by direct treatment of the raw material with a coagulating agent such as an organic acid.

In accordance with one embodiment of the invention a relatively heavy grade of cream is agitated with a well mixed combination of skim milk powder, salt, and sugar in the proper proportions. When the ingredients have combined to form a thin mix, the temperature is raised to above about 150° F. In order to obtain the best results the heating should be carried to above 170° F., preferably from about 180° to 185° F. As the mixture is heated it begins to thicken and if too thick when it reaches its final temperature, water may be added to adjust the consistency. The mix may then be mixed with flavoring ingredients, together with a suitable acid or other coagulating agent but is preferably first homogenized while hot. The ingredients should all have been well heated by this time and agitation is continued until the acid, flavoring ingredients, and mix are well combined. When this is accomplished, the spread may be packaged directly or it may be cooled first and then packaged. The addition of the acid almost instantaneously coagulates the casein and gives the spread its final stiff body.

As a starting material we prefer to employ heavy cream, containing about 35–50% butter fat, and skim milk powder, although the particular content of butter fat is not necessarily critical. In fact a lighter grade of cream may be used in conjunction with whole milk powder. The milk powder employed is preferably milk powder which has been produced by the spray drying process, since this type of powder has better mixing properties and gives better results with respect to the final body texture and flavor of the spread than powder produced by the roller process. The salt and sugar may be added after the original mix has been heated and homogenized and, therefore, need not be added to the cream at the time the powdered milk solids are added. A smoother product, however, is obtained by mixing all of the dry ingredients and adding them to the cream prior to homogenization. Homogenization may be carried out in any desirable manner, although we prefer to use a pressure of about 3000 lbs. per square inch to effect the best smoothing action and to increase slightly the body of the mix. The mix which has been homogenized should contain all of the powdered or liquid ingredients except the acid and the homogenized mix is added directly to the previously heated acid and seasoning ingredients, such as fruits, nuts, olives, pickles, condiments, peppers, etc. These seasoning or various flavoring ingredients should be previously comminuted to the proper fineness. Coloring, if used, may be added when the mix is formed or afterwards, as desired.

A preferred procedure for making a spread, consists of placing cream of about 40–50% butter fat content in a cold vessel and sifting in dry ingredients including a mixture of spray dried skim milk powder, salt, and sugar in proper proportions for the particular spread being made, while agitating the contents of the vessel. When the mixing has been completed, the vessel should be heated to about 175° F. Coloring matter, if needed, may be added at this time.

Condiments and flavoring ingredients are separately prepared by comminuting to the desired size and heating with the acid. Any suitable casein coagulating acid may be employed such as acetic, lactic, and/or citric acids. For example, acetic acid may be employed in the form of vinegar. The condiments and acid or acids are preferably heated to at least 180° F. to destroy any micro-organisms present. The hot mix is now homogenized and added directly to the acidified condiments and the mixture is then ready for packaging. Casein coagulating salts or even rennet may also be used in conjunction with the acid, if desired.

The following specific formula is given by way of example and is illustrative of the invention: Pimento cream spread:

| | |
|---|---|
| Butter fat as pasteurized cream (180 lbs. 40% cream)_____pounds__ | 72 |
| Spray dried skim milk powder__do____ | 30 |
| Salt_____ounces__ | 36 |
| Citric acid_____do____ | 21 |
| Sugar_____pounds__ | 7½ |
| Pimentos (ground large)_____do____ | 30 |
| Cheese color_____ounces__ | 3 |
| Vinegar_____quarts__ | 3 |

This improved method has many advantages over the customary fashion of making cream-cheese spreads in that spreads can be made up to fill rush orders and it is not necessary to start making the spreads until the orders are received, the time required for making a 400 pound batch of spread being only two hours. Less spoilage occurs due to the fact that the spread has been subjected to temperatures around 180° F. or higher and the product is notable for its absence of bacteria, yeast and other micro-organisms.

The product may also be made by more sanitary methods since it is not necessary to use the muslin drainage bags and the handling of the ice and draining of the curds is completely eliminated. Similarly, the material is not allowed to develop micro-organisms since no period of incubation is employed.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

We claim:

1. A process of preparing a cheese-like cream spread comprising treating a homogenized mixture containing cream and milk powder with an acid at a temperature above about 150° F.

2. A process in accordance with claim 1 in which the mix is at a temperature above about 170° F. when treated with the acid, and the acid is selected from the group consisting of acetic, citric and lactic acids.

3. The process of preparing a cheese-like spread comprising mixing cream with milk solids, salt, and sugar to form a mix of a thin consistency, heating said mix above about 150° F., homogenizing the mix, and treating the same with a casein coagulating agent while at a temperature above about 150° F.

4. The process of preparing a cream spread comprising mixing cream with milk solids, salt, and sugar to form a mix of a thin consistency, heating said mix to a temperature above about 150° F., heating separately a mixture of condiments and acid to a similar temperature, and mixing said separate heated mixtures together.

5. A process of preparing a cheese-like cream spread comprising treating a homogenized mixture containing cream and spray dried milk powder with an acid at a temperature above about 150° F.

6. A process of preparing a cheese-like food product including the step of mixing sufficient acid with a substantially uniform mix of milk solids and water at an elevated temperature to coagulate said milk solids, said mix having a thin pasty consistency and containing a relatively large quantity of butter fat.

7. A process of preparing a cheese-like food product comprising subjecting a substantially uniform pasty mixture of cream and milk powder to treatment with an acid at a temperature above about 150° F.

8. In a process of making a cheese-like food product, the step of subjecting a thin pasty mix of milk solids and water containing a large quantity of butter fat to coagulation at a temperature of approximately 180 to 185° F. with an acid selected from the group consisting of acetic, lactic and citric acids.

9. In a process of making a cheese-like food product, the step of subjecting a thin pasty mix of milk solids and water coagulated by direct addition of an acid, to a temperature above about 150° F.

10. A process of preparing a cheese-like food product comprising treating a substantially homogeneous thin pasty mix of milk solids and water relatively rich in butter fat with an acid at a temperature above about 150° F.

THERON H. BUTTERWORTH.
WILLIAM A. SOMMER.